United States Patent [19]

Lizen

[11] 4,347,790
[45] Sep. 7, 1982

[54] EXPLOSIVE PLUG FOR BLOCKING TUBES

[75] Inventor: Christian E. Lizen, Vencimont, Belgium

[73] Assignee: Cockerill and Centre de Technologies Nouvelles, Seraing and Liege, Belgium

[21] Appl. No.: 166,961

[22] Filed: Jul. 8, 1980

[30] Foreign Application Priority Data

Jul. 11, 1979 [BE] Belgium .............................. 0/196251

[51] Int. Cl.³ .............................................. F42D 3/00
[52] U.S. Cl. ..................... 102/304; 102/323; 102/333; 102/320; 228/2.5; 138/89; 138/97; 376/305
[58] Field of Search ................... 176/37; 102/304, 323, 102/324, 333, 320; 138/89, 97; 228/2.5; 376/277, 305

[56] References Cited

U.S. PATENT DOCUMENTS

| | | | |
|---|---|---|---|
| 1,192,958 | 8/1916 | Tucker | 102/333 |
| 1,751,015 | 3/1930 | Mora | 102/333 X |
| 3,590,877 | 7/1971 | Leopold et al. | 138/89 |
| 3,724,062 | 4/1973 | Cantrell et al. | 138/89 X |
| 3,781,966 | 1/1974 | Lieberman | 138/97 X |
| 3,785,291 | 1/1974 | Bergbaver et al. | 138/97 X |
| 3,919,940 | 11/1975 | Ploger et al. | 102/333 X |
| 4,028,789 | 6/1977 | Loch | 138/97 X |
| 4,074,630 | 2/1978 | Zondag | 102/333 X |
| 4,158,370 | 6/1979 | Larson | 138/89 |

Primary Examiner—Peter A. Nelson
Attorney, Agent, or Firm—Fitzpatrick, Cella, Harper & Scinto

[57] ABSTRACT

An explosive plug for blocking tubes comprises a tubular metal body closed at one end by a solid head and having at the other end a surface-contact region containing at least two spaced apart charges actuable by a detonator. The metal body when placed in a tube to be blocked is so arranged that the surface-contact region is coaxial with but at a distance from the tube so that successive explosion of the charges causes the surface-contact region to be radially spattered against the interior of the tube thus producing a reliable metal weld or welds extending along a substantial part of the end region of the tube.

7 Claims, 1 Drawing Figure

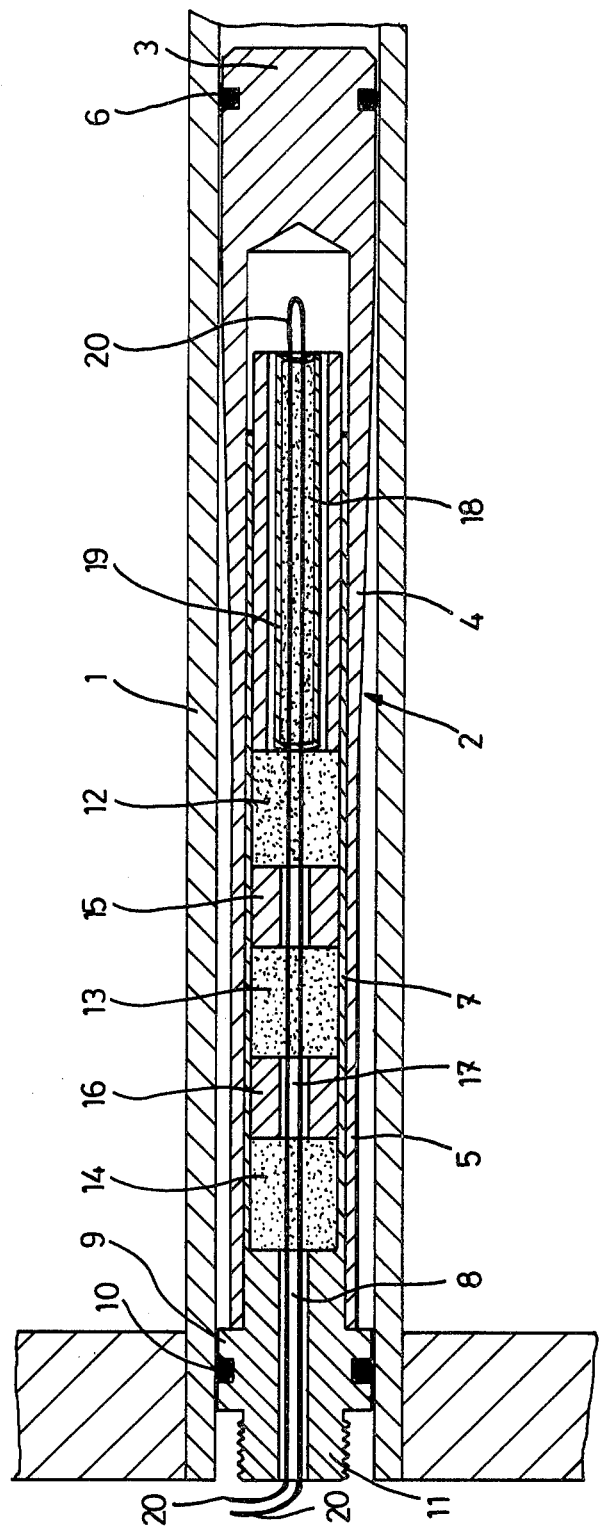

EXPLOSIVE PLUG FOR BLOCKING TUBES

BACKGROUND OF THE INVENTION

The invention relates to an explosive plug for blocking tubes. The plug is suitable in general for tubes of boilers, steam generators and heat exchangers. The plug is more particularly suitable for blocking the tubes of steam generators forming a part of a nuclear power station.

When a steam generator tube, for example, has a leak or a threatened leak, it has to be put out of operation by stopping up each end. The ends of a faulty tube are stopped by means of explosive plugs. An explosive plug substantially comprises a tubular metal body closed at one end by a solid head and open at the other end. The metal body has a surface-contact region extending from its open end and containing an explosive charge which can be fired by a detonator. During operation, the metal body is inserted and engages in the end of the faulty tube. Next, the charge is exploded and the surface-contact region of the metal tube is spattered against the end of the deflective tube at a pressure and temperature such that the metal or alloys forming the surface-contact region and the aforementioned end are chemically bonded and form a metallurgical weld.

A first known plug for blocking the ends of tubes in a steam generator or the like has a metal body and a surface-contact region which is frusto-conical and flared towards the solid head. The surface-contact region contains a single explosive charge. The detonator is disposed in the metal body at the end opposite the head relative to the explosive charge. In order to block the end of a defective tube, using the known plug, the metal body is mounted in the end of the tube, which has previously been frusto-conically widened towards the exterior. During the assembly process, the frusto-conical surface-contact region of the metal body is placed opposite the flared part of the aforementioned end. When the charge explodes, the surface-contact region is bent back and welded to the flared part of the end in question.

The first known plug has disadvantages. It is difficult to position the plug in the end of the tube before the explosive and hold it there. The surface-contact region is applied to the flared end of the tube by spattering the metal or alloy forming the aforementioned region at a given angle corresponding to the conicity of the aforementioned end. In other words, the metal or alloy in the surface-contact region is spattered against the flared end of the tube from distances which increase in proportion to the common longitudinal axis of the surface-contact region and the tube. Consequently, the metal or alloy in the surface-contact region may be spattered along the flared end of the tube, since the variation in pressures and temperatures is such that the metal weld between the metal body and the end may be defective. The weld is even less reliable in that it is relatively short and extends only along the limited length of the flared end of the tube.

A second known plug has a metal body and a surface-contact region which is likewise frusto-conical and contains a single explosive charge. As before, the detonator is mounted at the end remote from the head of the metal body relative to the explosive charge. When the plug is used, the end of the faulty tube which is to be blocked is not widened and remains cylindrical. When the metal body is mounted in the aforementioned end, the surface-contact region is placed level therewith, its wider part facing the interior of the tube. When the charge explodes, the surface-contact region is bent back and welded to the aforementioned end as a result of spattering of metal or alloy at an angle defined by the conicity of the surface-contact region. Consequently, the second known plug has substantially the same disadvantages as the first.

SUMMARY OF THE INVENTION

According to the present invention there is provided an explosive plug for blocking a tube, the plug comprising a tubular metal body closed at one end by a solid head and having at the other end a surface-contact region containing at least two spaced apart explosive charges and a detonator to actuate the charges, the metal body being such that when the body is placed in a tube to be blocked the surface-contact region is coaxial with but at a distance from the tube so that successive explosion of the charges causes the surface-contact region to be radially spattered against the interior surfaces of the end region of the tube thus producing a metal weld or welds extending along a substantial part of the end region of the tube.

The separate charges exert parallel radial pressure on the surface-contact region and thus a plug in accordance with the present invention can have a simpler shape than the prior art plugs. The surface-contact region can, for example, be cylindrical, and thus the plug can be more easily positioned in the end of the faulty tube than prior plugs. A preferred plug in accordance with the invention also produces a longer metal weld and is less sensitive than prior-art plugs to the usual tolerances in some parameters or operating factors.

Preferably, the metal body has a connecting region between the solid head and the cylindrical surface-contact region and in order to prevent the part of the metal body connecting the surface-contact region to the solid head from cracking during the successive explosions of the two charges, the connecting region of the metal body has an outer surface which is regularly flared, usually frusto-conically, toward the head.

In an embodiment of the present invention, the explosive charges and the detonator are disposed in a tube made of a synthetic material and extending coaxially within the metal body through the entire surface-contact region and part of the connecting region, the explosive charges being adjacent the surface-contact region and the detonator being adjacent the connecting region, the said at least two explosive charges being axially separated by a ring of a synthetic material such that the second charge can be primed by the first after the first has been primed by the detonator there being an axial passage extending along the entire length of the synthetic material tube to accomodate wires for firing the detonator.

In order to protect the connecting region of the metal body against spattered material, the detonator is advantageously placed in a cover made of a synthetic material and mounted in the synthetic material tube containing the explosive charges.

The synthetic material tube can easily be fixedly mounted in the metal body, for example by sticking, and may be easily positioned relative to the metal body, preferably by providing an outer collar on the synthetic material tube which can be pressed against the end of the surface-contact region. Preferably the outer collar is provided with means whereby axial tension can be applied thereto. Conveniently, in order to facilitate centering of the plug when it engages in the tube to be blocked, the outer collar of the synthetic material tube and the solid head of the metal body may bear identical O-rings.

BRIEF DESCRIPTION OF THE DRAWING

In order that the invention may be readily understood, an embodiment thereof will now be described, by way of example, with reference to the accompanying drawing in which the single FIGURE is a diagrammatic longitudinal axial section through an embodiment of the invention.

DESCRIPTION OF AN EXEMPLARY EMBODIMENT

The drawing shows an explosive plug adapted to block the end of a tube 1 forming for example part of a bundle in a steam generator in a nuclear power-station. The tube 1 is made of special steel or nickel alloy. The plug comprises a metal body 2 which, for example, may likewise be made of special steel such as tempered stainless steel 304 or a nickel alloy such as INCONEL. The aforementioned steel and alloy are particularly corrosion-resistant.

The metal body 2 comprises in succession a solid head 3, a connecting region 4 and a surface-contact region 5. The metal body 2 is a tubular element closed at one end by the solid head 3 and open at the end adjacent the surface-contact region 5. The solid head 3 gives mechanical strength to the plug. The outer diameter of head 3 is greater than the diameter of the connecting region 4 and the surface-contact region 5. The outer surface of head 3 has a circumferential groove holding an O-ring 6 made of rubber or similar synthetic material. The surface-contact region 5 is, for example, a regular tube having a constant cross-section. Thus, the inner and outer surfaces of region 5 are cylindrical and coaxial. The connecting region 4 is an irregular tube having a cross-section which increases uniformly towards the head 3. The inner surface of region 4 is cylindrical and merges smoothly with the surface of region 5 to form a cylindrical bore in the metal body 2. The outer surface of region 4 is frusto-conical and is of a diameter which increases from region 5 to head 3. The outer surface of region 4 provides a connection between the outer surfaces of region 5 and head 3. A tube 7 made of a synthetic material such as polyethylene is axially mounted in the bore of body 2. The outer diameter of tube 7 is substantially equal to the inner diameter of the bore in body 2. Tube 7, accordingly, is disposed without substantial radial clearance in the bore of body 2. Tube 7 is also secured to body 2, e.g. by being stuck in the bore thereof.

Towards the end of tube 7 remote from head 3 the wall of the tube is thicker than the wall of the remainder of tube 7, i.e. the inner diameter of the tube is substantially smaller than that of the remainder of the tube while its outer diameter is the same as the corresponding diameter of the remaining part of tube 7. The aforementioned end having a thicker wall therefore forms an axial bore 8 having a relatively small cross-section. The end with the thicker wall also has an outer collar 9 having an outer cylindrical surface, the diameter of which is substantially equal to that of the corresponding surface of the head 3. Collar 9 is pressed against the free edge of the surface-contact region 5. The outer surface of collar 9 has a circumferential groove the hold an O-ring 10 identical with the previouslymentioned O-ring 6. The end also comprises means whereby axial tension or an axial thrust can be exerted on it. This may facilitate withdrawal of the synthetic tube from the tube to be blocked. The means is for example a threaded projection 11 having a smaller diameter than collar 9. Tube 7 contains at least two explosive charges and in the preferred embodiment three charges 12, 13 and 14. Explosive charges 12, 13 and 14 are separated from one another along the longitudinal axis of tube 7 and are all in the surface-contact region 5. Charges 12, 13 and 14 can be made of the same powder mixture or of different powder mixtures. Charges 12, 13 and 14 are axially separated from one another by two rings 15, 16 made of a synthetic material, e.g. polyethylene. Each ring 15, 16 has a cylindrical bore 17 having a diameter substantially equal to that of the corresponding bore 8 of the aforementioned end of tube 7. Coaxial bores 8 and 17 thus combine to form an axial passage, the purpose of which will be described hereinafter.

Tube 7 also contains a detonator 18 disposed in a cover 19 made of a synthetic material such as polyethylene. Detonator 18 in cover 19 is adjacent the first explosive charge 12. Detonator 18 and cover 19 are in the connecting region 4 of metal body 2. Cover 19 is used for placing the detonator 18 in the metal body 2 and protecting the body 2 against spattered material when detonator 18 is fired. Firing wires 20 extend through the aforementioned bores 8 and 17 and charges 12, 13 and 14 to detonator 18.

When the plug is mounted at the end of tube 1, the metal body 2 is inserted and engages in the end until the outer collar 9 is substantially flush with the end. During positioning, the plug is guided and centered along the axis of tube 1 by O-rings 6 and 10.

In order to explode the plug when mounted in the end of tube 1, detonator 18 is first fired and instantaneously sets off the first explosive charge 12. When charge 12 explodes, the shock wave travels through the first ring 15 and reaches the second explosive charge 13. Charge 13 thereupon explodes and the resulting shock wave travels through ring 16 and reaches the third explosive charge 14, which explodes and thus completes the explosion of the plug. The successive explosions of the three charges 12, 13 and 14 cause a considerable rise in pressure and temperature in the bore of the metal body 2 and radially spatter the surface-contact region and press it in parallel against the corresponding end of tube 1. During the spattering, the metal or alloy in region 5 and the metals at the end of tube 1 become chemically bonded in a continuous region or in a number of discontinuous regions, this depending inter alia, on the number of explosive charges used, e.g. two, three, four, five or six regions, forming a corresponding number of reliable metal welds. During the successive explosions of detonator 18 and charges 12, 13 and 14, the outer geometrical shape of the connecting region 4 prevents it cracking or body 1 from being destroyed.

The plug which has been shown and described is used for blocking a steam-generator tube. However; it may also be used to block a tube in a heat exchanger, boiler or any other bore.

Of course, the invention is not exclusively limited to the embodiment shown. Numerous modifications can be made to the form, arrangement and construction of some of the components.

We claim:

1. An explosive plug for blocking a tube, comprising a tubular metal body closed at one end by a solid head and having at the other end a cylindrical surface-contact region, said tubular metal body being such that when it is placed in a tube to be blocked the surface-contact region is coaxial with but at a distance from the tube, said surface-contact region containing a plurality of explosive charges and a detonator disposed in a tube made of a synthetic material which extends coaxially within the metal body, the adjacent explosive charges being axially separated by a ring of a synthetic material such that the charges can be primed one after another by the detonator, there being an axial passage extending along the entire length of the synthetic tube to accommodate wires for firing the detonator.

2. An explosive plug according to claim 1, wherein the metal body has a connecting region between the solid head and the cylindrical surface-contact region, said connecting region having an outer surface which is regularly flared toward the head and having a geometrical shape which prevents the connecting region from cracking during successive charge explosions, said tube of a synthetic material extending coaxially within the metal body through the entire surface-contact region and a part of the connecting region.

3. An explosive plug according to claim 1, wherein the detonator is placed in a cover made of a synthetic material mounted in the synthetic material tube and adapted to protect the connecting region of the metal body when the detonator explodes.

4. An explosive plug according to claim 1, wherein the synthetic tube containing the explosive charges and the detonator is securely mounted in the metal body.

5. An explosive plug according to claim 1, wherein the synthetic material tube containing the explosive charges and the detonator has an outer collar which can be pressed against the end of the surface-contact region of the metal body.

6. An explosive plug according to claim 5, wherein the outer collar of the synthetic material tube is provided with means whereby axial tension can be applied thereto.

7. An explosive plug according to claim 5, wherein the outer collar of the synthetic tube and the solid head of the metal body bear identical O-rings to enable the plug to be centered when the plug engages in the end of the tube to be blocked.

* * * * *